United States Patent Office 3,023,230
Patented Feb. 27, 1962

3,023,230
PRODUCTION OF CHLORALKYL ESTERS OF ACRYLIC ACID AND THEIR SUBSTITUTION PRODUCTS
Hubertus Baron, Ludwigshafen (Rhine), and Herbert Friederich, Worms (Rhine), Germany, assignors to Badische Anilin- & Soda-Fabrik Aktiengesellschaft, Ludwigshafen (Rhine), Germany
No Drawing. Filed Mar. 2, 1959, Ser. No. 796,217
Claims priority, application Germany Mar. 5, 1958
4 Claims. (Cl. 260—486)

This invention relates to a process for the production of chloralkyl esters of acrylic acid and its substitution products and to new chloralkyl esters of acrylic acid.

We have found that new chloralkyl esters of acrylic acid or its substitution products of the formula

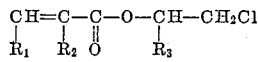

in which $R_1$ means H or $-CH_3$, $R_2$ H, $-CH_3$ or Br and $R_3$ an alkyl group which may contain an ether or an ester group can be prepared in a simple manner by reacting acrylic acid chloride which may be substituted in alpha-or beta-position by halogen or lower alkyl radicals with epoxides. The ethylene oxide ring is thereby forced open and the acrylic acid chloride reacts by the chlorine attaching itself to the carbon and the acryloyl radical to the oxygen of the epoxide. In the case of substituted ethylene oxides, the esters of secondary alcohols are formed. Thus for example the acrylic acid ester of 1.3-dichloropropanol-(2):

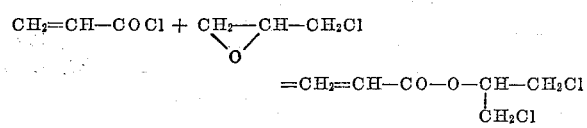

is formed by the reaction of acrylic acid chloride with epichlorhydrin.

Suitable epoxy compounds for use in the process corresponding to the invention other than epichlorhydrin are alkylene oxides containing 2 to 3 carbon atoms, such as ethylene oxide and propylene oxide. Styrene oxide can be used too. Sutiable epoxy compounds are also alkyl or aryl glycidol ethers e.g., the glycidol ethers of aliphatic alcohols containing 2 to 18 carbon atoms, preferably 2 to 10 carbon atoms, such as ethanol, propanol, butanol, hexanol or octanol. Other epoxy compounds are glycidol esters of saturated and unsaturated aliphatic monocarboxylic acids containing 2 to 18 carbon atoms, preferably 2 to 10 carbon atoms. Such compounds are for example the glycidol esters of acetic, propionic, capronic, caprylic or stearylic acid or of acrylic acid and vinyl acetic acid.

For reaction with the epoxy compounds there may be used not only acrylic acid chloride but also acrylic acid chlorides substituted in alpha- or beta-position by halogen or lower alkyl radicals, as for example alpha-halogen acrylic acid chlorides, such as alpha-chloro- or alpha-brom-acrylic acid chlorides, or alkyl acrylic acid chlorides, such as methacrylic acid chloride or crotonic acid chloride.

Catalysts are not necessary for the reaction but it is advantageous to add to the reaction mixture a small amount, that is about 0.01 to 1 percent, with respect to the acrylic acid chloride, of an acid reacting catalyst, as for example Friedel-Crafts compounds, for example $AlCl_3$, $BF_3$ or HCl, $H_2SO_4$ or $SnCl_4$.

Since the reaction proceeds exothermically, it is necessary in some cases to cool the reaction vessel at the beginning of the reaction to lead away the amount of heat set free. Towards the end of the reaction, however, it is necessary to heat the reaction vessel in order to achieve a more complete reaction. In general the reaction proceeds completely in the temperature range between 20 and 150° C., preferably 20 and 120° C.

When heating the reaction mixture is not possible by reason of the ready volatility of the epoxy compounds, the reaction may advantageously be carried out in a heatable pressure vessel.

It is possible to work with or without an organic solvent. Suitable solvents are for example those which are inert to the initial compounds and the end product, such as chlorinated hydrocarbons, for example chloroform, or also benzene.

The acrylic acid chloride and the epoxy compound are preferably brought together in stoichiometric ratio. It is only in cases in which the epoxy compound does not directly react itself to polymeric products in the presence of acid catalysts, that the reaction can be carried out in the presence of an excess of epoxy compound. On the other hand if an excess of acrylic acid chloride is used, there are formed to an increasing extent products of higher boiling point which are probably reaction products of a dimeric form of acrylic acid chloride with the epoxy compound.

The acrylic acid chlor-alkyl-esters obtained by the said process may be very readily polymerized in pure form. By reason of their chlor content they are difficultly combustible, especially the chlor-alkyl esters of halogen-substituted acrylic acid. In order to avoid a premature polymerization, it is advantageous not to allow the reaction to proceed to completion but to discontinue it at a 50 to 70 percent conversion and to distil off under normal pressure or under reduced pressure the unreacted product which can be reacted again.

The chlor-alkyl esters of acrylic acid may readily be obtained pure by distillation under reduced pressure. In order to avoid a premature polymerization, the pure products must be stored cool, and in the dark. They can be stabilized against polymerization with phenothiazine or hydroquinone. In the distillation, the stabilizer is preferably not added until after the unreacted acrylic acid chloride has been distilled off. It is advantageous to lead in an inert gas into the distillation vessel, for example carbon dioxide.

The following examples will further illustrate this invention but the invention is not restricted to these examples. The parts specified in the examples are parts by weight.

Example 1

0.2 part of concentrated hydrochloric acid is added to a mixture of 156 parts of acrylic acid chloride and 177 parts of epichlorhydrin while cooling, the mixture is stirred for 1½ hours at room temperature at about 20° C. and then boiled for 2 hours under reflux. By distillation under reduced pressure using a short column, about 45 parts of a mixture of unreacted acrylic acid chloride and epichlorhydrin and 264 parts of acrylic acid-1.3-dichlorpropyl ester-(2) with a boiling point of 86° to 100° C. at a pressure of 18 mm. Hg and a refractive index of $n_D^{20}=1.4724$ are obtained. The ester can be stabilized against polymerization with phenothiazine.

3 parts of anhydrous aluminum chloride may be used as catalyst instead of 0.2 part of hydrochloric acid. It is advantageous to lead carbon dioxide in during the reaction and the distillation.

When using instead of acrylic acid chloride methacrylic acid chloride or alpha-chlor or alpha-brom acrylic acid chloride then the corresponding 1.3-dichlorpropylester-(2) is obtained.

Example 2

A mixture of 102 parts of ethyl glycidol ether, 90 parts of acrylic acid chloride and 0.2 part of concentrated hydrochloric acid is stirred for 2 hours at 20° C. and for 3 hours at 90° C. Unreacted acrylic acid chloride and unreacted ethyl glycidol ether are distilled off at a pressure of about 20 mm. Hg using a short column. By distilling the acrylic acid 1-chlor-3-ethoxypropyl ester-(2), or, by the Geneva system, 2-ethoxy-1-chloromethyl-ethyl-(1)-acrylate, at 0.2 mm. Hg, 84 parts are obtained with a boiling point of 86° to 98° C. at 0.2 mm. Hg and a refractive index of $n_D^{20}=1.448$.

When using instead of acrylic acid chloride methacrylic acid chloride or alpha-chlor or alpha-brom acrylic acid chloride then the corresponding 1-chlor-3-ethoxypropyl ester-(2) is obtained.

Example 3

A mixture of 33 parts of ethylene oxide, 60 parts of acrylic acid chloride and 0.1 part of concentrated hydrochloric acid is heated for 3 hours at 100° C., in a pressure vessel. By subsequent distillation there are obtained 37 parts of acrylic acid beta-chlorethyl ester with a boiling point of 60° to 62° C. at 13 mm. Hg and a refractive index of $n_D^{20}=1.4492$ and 15 parts of a polymerizable fraction of higher boiling point (boiling point 110° to 140° C. at 15 mm. Hg; $n_D^{20}=1.4569$) with the analysis values: C 40.02; H 5.06; 0.22.5; Cl 32.2. About 30 parts of the mixture of ethylene oxide and acrylic acid chloride are recovered.

When using instead of acrylic acid chloride methacrylic acid chloride or alpha-chlor or alpha-brom acrylic acid chloride then the corresponding beta-chlorethyl ester is obtained.

Example 4

43.5 parts of propylene oxide, 60 parts of acrylic acid chloride and 0.1 part of concentrated hydrochloric acid are heated for 3 hours at 100° C. in a pressure vessel. By distillation there are obtained 39 parts of acrylic acid 1-chlorpropyl ester-(2) with a boiling point of 68° to 75° C. at 13 mm. Hg and a refractive index of $n_D^{20}=1.4432$ and 18 parts of a fraction of higher boiling point (boiling point 125° to 148° C. at 13 mm. Hg; $n_D^{20}=1.450$).

When using instead of acrylic acid chloride methacrylic acid chloride or alpha-chlor or alpha-brom acrylic acid chloride then the corresponding 1-chloropropyl ester-(2) is obtained.

We claim:

1. A process for the production of chloroalkyl esters of acrylic acid and substitution products thereof by reacting a compound selected from the group consisting of acrylic acid chloride, methacrylic acid chloride, crotonic acid chloride, alpha-chloro acrylic acid chloride and alpha-bromo acrylic acid chloride with and epoxide selected from the class consisting of alkylene oxides containing 2 to 3 carbon atoms, epichlorohydrin, styrene oxide, glycidol ethers of aliphatic alcohols containing 2 to 18 carbon atoms and glycidol esters of saturated and unsaturated aliphatic monocarboxylic acids containing 2 to 18 carbon atoms, at a temperature between 20 and 150° C.

2. A process for the production of chloroalkyl esters of acrylic acid and substitution products thereof by reacting a compound selected from the group consisting of acrylic acid chloride, methacrylic acid chloride, crotonic acid chloride, alpha-chloro acrylic acid chloride and alpha-bromo acrylic acid chloride with an alkylene oxide containing 2 to 3 carbon atoms, at a temperature of about 20 to 120° C.

3. 2 - ethoxy - 1 - chloromethyl - ethyl - (1) - acrylate.

4. A compound of the formula

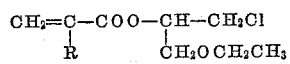

wherein R is selected from the group consisting of H, $CH_3$, Cl and Br.

References Cited in the file of this patent

UNITED STATES PATENTS

| 1,393,191 | Altwegg et al. | Oct. 11, 1921 |
| 2,454,274 | Daly et al. | Nov. 23, 1948 |

FOREIGN PATENTS

| 654,243 | Great Britain | June 13, 1951 |

OTHER REFERENCES

Gustus et al.: J. Am. Chem. Soc. 55, 380–384 (1933).
Rehberg et al.: II, J. Org. Chem. 14, 1095 (1949).
Rehberg et al.: I, J. Am. Chem. Soc. 72, 5200 (1950).